(12) United States Patent
Garrick et al.

(10) Patent No.: US 8,342,780 B2
(45) Date of Patent: Jan. 1, 2013

(54) SHIELDED PCD OR PCBN CUTTING TOOLS

(75) Inventors: Richard M. Garrick, Woodland Hills, UT (US); John A. Bunting, Provo, UT (US)

(73) Assignee: Precorp, Inc., Spanish Fork, UT (US)

( * ) Notice: Subject to any disclaimer, the term of this patent is extended or adjusted under 35 U.S.C. 154(b) by 848 days.

(21) Appl. No.: 12/253,368

(22) Filed: Oct. 17, 2008

(65) Prior Publication Data

US 2010/0098505 A1    Apr. 22, 2010

(51) Int. Cl.
*B23B 27/14*    (2006.01)
*B23B 51/02*    (2006.01)

(52) U.S. Cl. .......... 407/118; 407/119; 408/144

(58) Field of Classification Search .......... 407/119, 407/118; 428/357, 544, 545, 615; 408/144, 408/145; 76/108.6
See application file for complete search history.

(56) References Cited

U.S. PATENT DOCUMENTS

| | | | |
|---|---|---|---|
| 1,747,117 A | 2/1930 | Klein | |
| 2,332,295 A | 10/1943 | Bouchal | |
| 3,346,894 A | 10/1967 | Lemelson | |
| 3,387,511 A | 6/1968 | Ackart, Sr. et al. | |
| 3,779,664 A | 12/1973 | Caley et al. | |
| 4,093,395 A | 6/1978 | Luebbert et al. | |
| 4,373,593 A | 2/1983 | Phaal et al. | |
| 4,480,952 A | 11/1984 | Jeremias | |
| 4,527,643 A * | 7/1985 | Horton et al. | 175/420.2 |
| 4,529,341 A | 7/1985 | Greene | |
| 4,627,503 A * | 12/1986 | Horton | 175/420.2 |
| 4,713,286 A | 12/1987 | Bunting et al. | |
| 4,720,218 A | 1/1988 | DeFries et al. | |
| 4,762,445 A * | 8/1988 | Bunting et al. | 408/144 |
| 4,898,503 A | 2/1990 | Barish | |
| 4,988,241 A * | 1/1991 | Colligan | 407/51 |
| 5,065,647 A | 11/1991 | Johnson | |
| 5,173,014 A | 12/1992 | Agapiou et al. | |
| 5,195,403 A * | 3/1993 | Sani et al. | 76/108.6 |
| 5,197,233 A * | 3/1993 | Wiand | 451/28 |
| 5,217,332 A | 6/1993 | Takasaki et al. | |
| 5,272,940 A * | 12/1993 | Diskin | 76/108.6 |
| 5,273,380 A | 12/1993 | Musacchia | |
| 5,297,456 A | 3/1994 | Nishimura | |
| 5,354,155 A * | 10/1994 | Adams | 408/145 |
| 5,443,337 A * | 8/1995 | Katayama | 408/145 |
| 5,570,978 A | 11/1996 | Rees et al. | |
| 5,580,196 A * | 12/1996 | Thompson | 408/145 |
| 5,611,251 A * | 3/1997 | Katayama | 76/108.6 |
| 5,641,252 A | 6/1997 | Eriksson et al. | |
| 5,649,796 A | 7/1997 | Durney | |
| 5,685,671 A * | 11/1997 | Packer et al. | 407/54 |

(Continued)

FOREIGN PATENT DOCUMENTS

| | | |
|---|---|---|
| EP | 0003915 | 9/1979 |
| EP | 0 137 898 A1 | 4/1985 |
| JP | 09057515 | 3/1997 |
| JP | 2000-061720 | 2/2000 |
| JP | 2001-341019 | 12/2001 |
| JP | 2004-017238 | 1/2004 |
| JP | 2006-192510 | 7/2006 |
| WO | WO-2004/082874 A1 | 9/2004 |

*Primary Examiner* — Will Fridie, Jr.
(74) *Attorney, Agent, or Firm* — Madson IP, P.C.

(57) ABSTRACT

A veined cutting tool for producing holes in various materials is disclosed. The veined cutting tool includes a tungsten carbide body using a sintered abrasive particulate such as diamond (PCD) or Cubic Boron Nitride (PCBN). The cutting tool shields a portion of the PCD or PCBN edge on the cutting side to reduce the overall length of the exposed PCD or PCBN to prevent the cutting edge from chipping and increase the service life of the cutting tool.

21 Claims, 6 Drawing Sheets

U.S. PATENT DOCUMENTS

| | | | |
|---|---|---|---|
| 5,716,170 A | * 2/1998 | Kammermeier et al. | 408/145 |
| 5,816,755 A | 10/1998 | Thelin | |
| 5,931,615 A | 8/1999 | Wiker | |
| 5,981,057 A | * 11/1999 | Collins | 428/334 |
| 6,029,544 A | * 2/2000 | Katayama | 76/108.6 |
| 6,030,156 A | 2/2000 | Andronica | |
| 6,126,367 A | 10/2000 | Reed | |
| 6,132,148 A | 10/2000 | Thompson | |
| 6,315,504 B1 | 11/2001 | Sekiguchi et al. | |
| 6,923,602 B2 | 8/2005 | Osawa et al. | |
| 7,367,758 B2 | 5/2008 | Turrini et al. | |
| 2003/0202853 A1 | 10/2003 | Ko et al. | |
| 2005/0135889 A1 | 6/2005 | Turrini et al. | |
| 2006/0269372 A1 | 11/2006 | Goshima | |

* cited by examiner

US 8,342,780 B2

SHIELDED PCD OR PCBN CUTTING TOOLS

FIELD OF THE INVENTION

The present invention relates generally to cutting tools. More specifically, the present invention relates to an improvement in Polycrystalline Diamond (PCD) veined or Polycrystalline Cubic Boron Nitrite (PCBN) veined cutting tools.

BACKGROUND

Veined cutting tools as described in U.S. Pat. Nos. 4,713,286 and 4,762,445 provide for drills, end mills, reamers and other cutting tools with multiple cutting edges fixed to a tungsten carbide body using a sintered abrasive particulate such as diamond (PCD) or CBN. These tools have proven to be advantageous in drilling, reaming, and milling various advanced composite materials and non-ferrous materials and are now well known as cutting tools.

Generally, the high cost and delicate nature of these tools restrict them to use only where cutting conditions can be closely controlled by computer numerically controlled (CNC) machines to avoid impact, vibrations, and/or variable feed conditions that would destroy the cutting edges.

One area where such veined PCD or PCBN tools are widely used is in drilling advanced carbon fiber reinforced plastic (CFRP) composites and stackups of these materials with aluminum or titanium on CNC equipment for advanced aircraft frames. However, many areas of these planes do not allow for the use of CNC drilling equipment making portable power feed air motors the preferred method of drilling the necessary fastener holes.

Prior to this invention, the use of PCD or PCBN drills with these air motors was not considered feasible for drilling difficult materials like layers of advanced composites and titanium. Typically, these air motors use what is called a hard tooling fixture with guide bushings. PCD or PCBN drills were known to chip the sides or margins of the drill as they were guided by these bushings due to the delicate nature of the exposed PCD cutting edge.

U.S. Pat. No. 5,611,251 also teaches a method of making a PCD or PCBN drill using a brazeable PCD or PCBN blank and makes reference to other variations for brazeable PCD and PCBN drill construction using commercially available blanks from Megadiamond or Debeers.

Such cutting tool construction taught or referenced by U.S. Pat. No. 5,611,251 invariably uses low rake angles to strengthen the cutting edge and to compensate for the ready nature of these edges that tend to chip. Such art does not teach a way of preventing the chipping of the cutting edges.

In view of the limitations of prior art PCD drill bits, reamers, and milling cutting tools, the present invention was developed to address these limitations and is an improved PCD cutting tool having a shielded PCD or PCBN cutting edge.

SUMMARY OF THE INVENTION

The present invention relates generally to cutting tools. In the present invention, a PCD or PCBN cutting tool and method of manufacture is provided with a shielded cutting edge leaving only a small portion of the cutting edge exposed to engage the work material.

Such shielding prevents the delicate edges of the PCD from being damaged by bushings or the work material while still providing for additional tool life by removing the shielding material in increments as necessary to expose fresh cutting edges.

To manufacture a cutting tool with a shielded cutting edge, the vein of PCB or PCBN or any other suitable material is angled such that a shield is created for the vein by leaving a portion of the shielding material in front of the vein during the grinding processes used to form the cutting tool.

DETAILED DESCRIPTION

The embodiments of the present invention will be best understood by reference to the drawings. It will be readily understood that the components of the present invention, as generally described and illustrated in the figures herein, could be arranged and designed in a wide variety of different configurations. Thus, the following more detailed description of the embodiments of the cutting tools of the present invention, as represented in FIGS. 3 through 6, is not intended to limit the scope of the invention, as claimed, but is merely representative of presently preferred embodiments of the invention.

The apparatus and method of the present invention have been developed in response to the present state of the art, and in particular, in response to the problems and needs in the art that have not yet been fully resolved by currently available cutting tools. The present invention has wide application in machining applications as diverse as reaming automotive engine valve guides as well as drilling stackups of CFRP and titanium airframe parts. The shielding of the delicate cutting edges will open many applications where these cutting tools in the past have not stood up to the various cutting forces.

Figure 1:
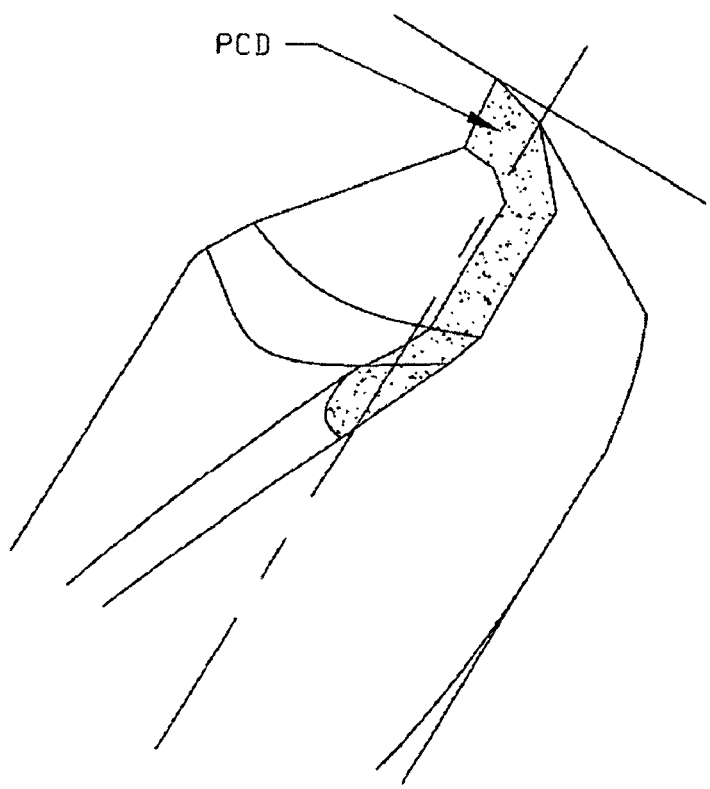
FIG. 1 is a side plan view of the end of a drill bit representative of the current state of the art.
Figure 2:
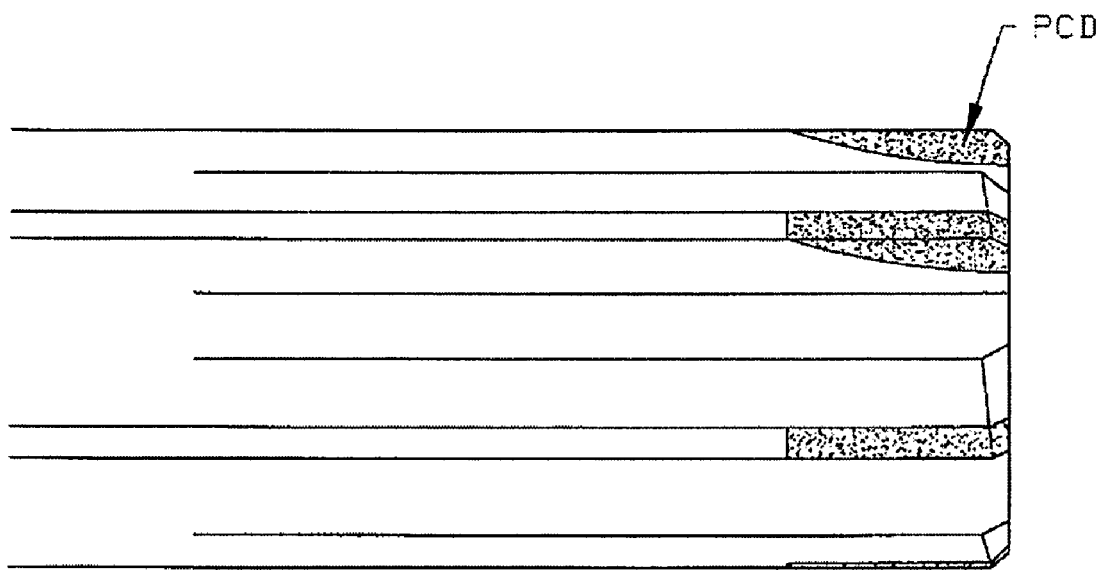
FIG. 2 is a side plan view of the end of a reamer representative of the current state of the art.

FIGS. 1 and 2 illustrate prior art of PCD or PCBN cutting tools. In these tools the PCD or PCBN is exposed along the margin of the tools to provide additional regrind life and to aid in the chip flow across the face of the PCD or PCBN and to avoid the welding of the chips to the cutting edge.

Figure 3:
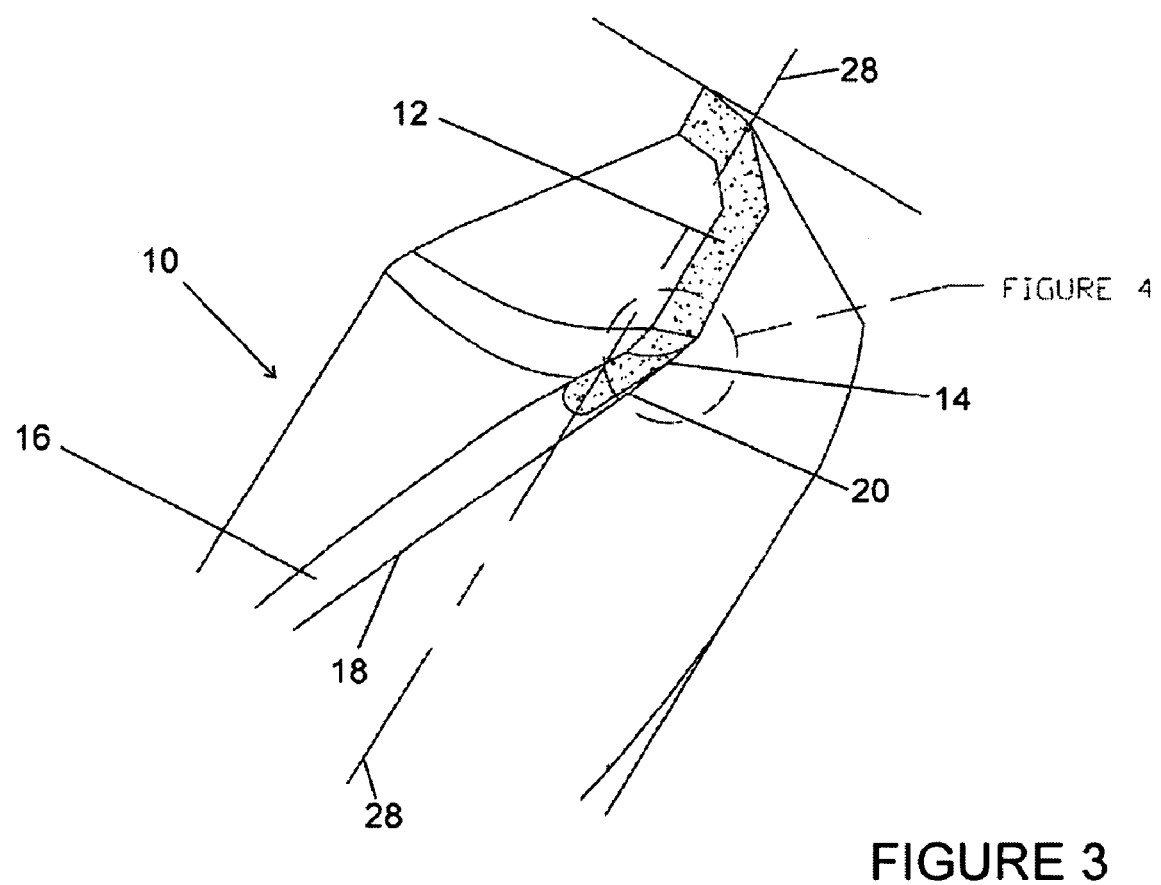
FIG. 3 is a perspective of an embodiment of the end of a drill according to the present invention.
Figure 4:
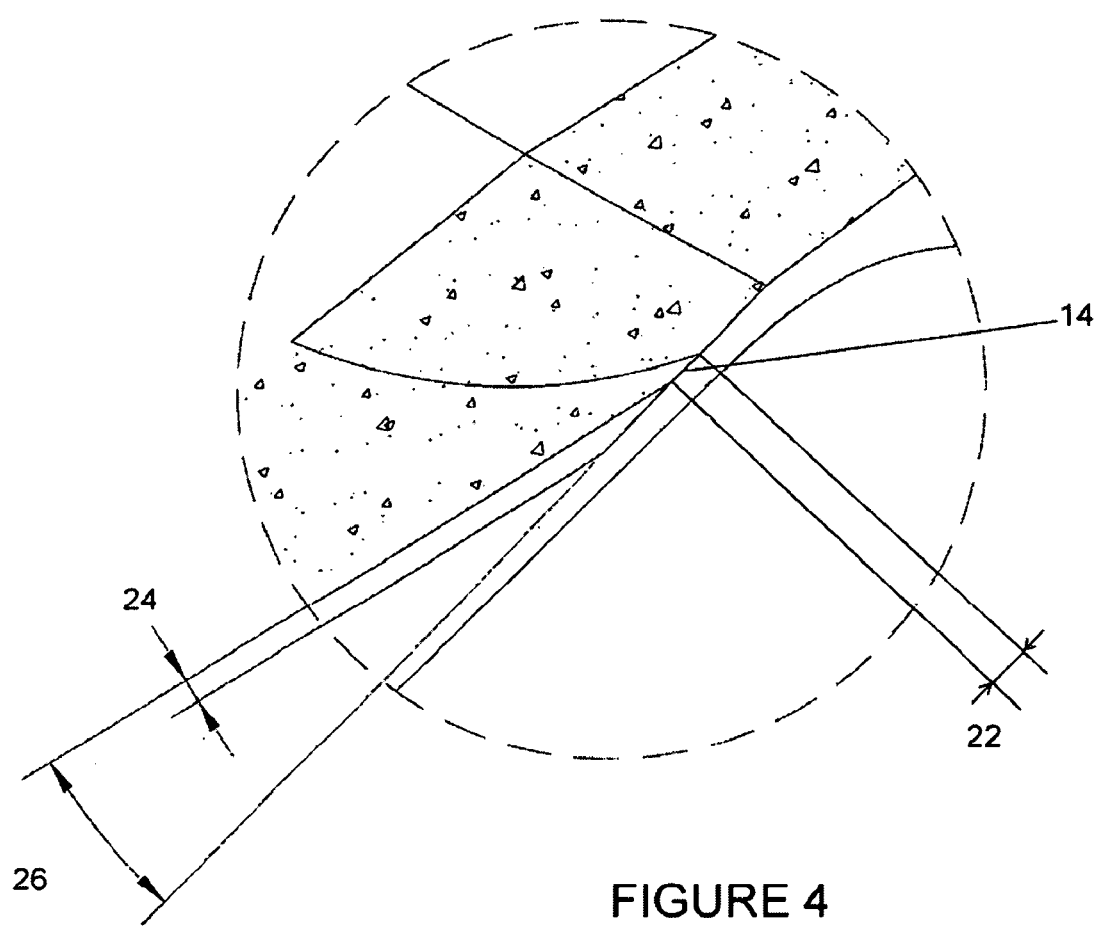
FIG. 4 is an enlarged view of the drill shielding at the corner of a drill in the area specified FIG. 3.

FIGS. 3 and 4 illustrate a PCD or PCBN drill using a shielded cutting edge where the shielding protects the side of the tool from damage from chipping or fracturing along this edge.

In FIG. 3, the drill 10 which has a body made of a first material such as tungsten carbide, also has a vein 12 of a suitable second material such as a sintered abrasive particulate such as Polycrystalline Diamond (PCD) or Polycrystalline Cubic Boron Nitrite (PCBN) having a cutting edge 14. The drill 10 also has a land 16 and a lead 18 that is the leading edge of the land 16. The vein 12 is angled such that a shield 20 is created that extends along the leads 18 in front of and adjacent to the vein 12. This shield 20 is positioned in the area that is particularly susceptible to chipping use to prevent unwanted chipping of the vein 12.

FIG. 4 shows the shielding 20 of the PCD or PCBN edge 14 in more detail with reference numeral 22 being the distance of the exposed PCD or PCBN edge 14 of the vein 12, such distance being a minimum of 0.002 inches and a maximum of 0.010 inches in preferred embodiments. The rake angle 26 intersects with the flute angle to create the exposed PCD or PCBN edge 14, and the thickness of the shielding 20 in front of the PCD or PCBN vein 12 is defined by thickness 24 and preferably will be a minimum of 0.005 inches up to about 0.015 inches, but more preferably about 0.010 inches. The rake angle 26 can be varied to create different exposed edges 14 of the PCD or PCBN depending on the helix angle of the drill 10.

In one embodiment, the helix angle is preferably about 24 degrees and the rake angle 26 is preferably about 4-8 degrees positive to the central axis 28 (FIG. 3) of the drill 10, with the optimal rake angle 26 being about 6 degree positive to the central axis 28.

The shielding 20 material is fused directly to the PCD or PCBN with an extremely strong attachment or bond to avoid being peeled back by the force of material flowing across the edge and is best attached during the Ultra High Pressure sintering process used to produce veined tools as disclosed in U.S. Pat. No. 4,713,286.

The material can be varied in the sintering process and can include a number of materials that can both protect the PCD or PCBN cutting edge 14 and provide other beneficial properties such as lower friction. In the simplest form, the shielding 20 material is the same tungsten carbide of the drill 10 used to hold the vein 12. In such cases, the shielded cutting edge 14 results from leaving a portion of the original nib material in front of the vein 12 during the grinding processes. This also has the beneficial effect of lowering the manufacturing costs by avoiding contact between the cutting edge 14 and the vein 12 of PCD or PCBN.

Figure 5:
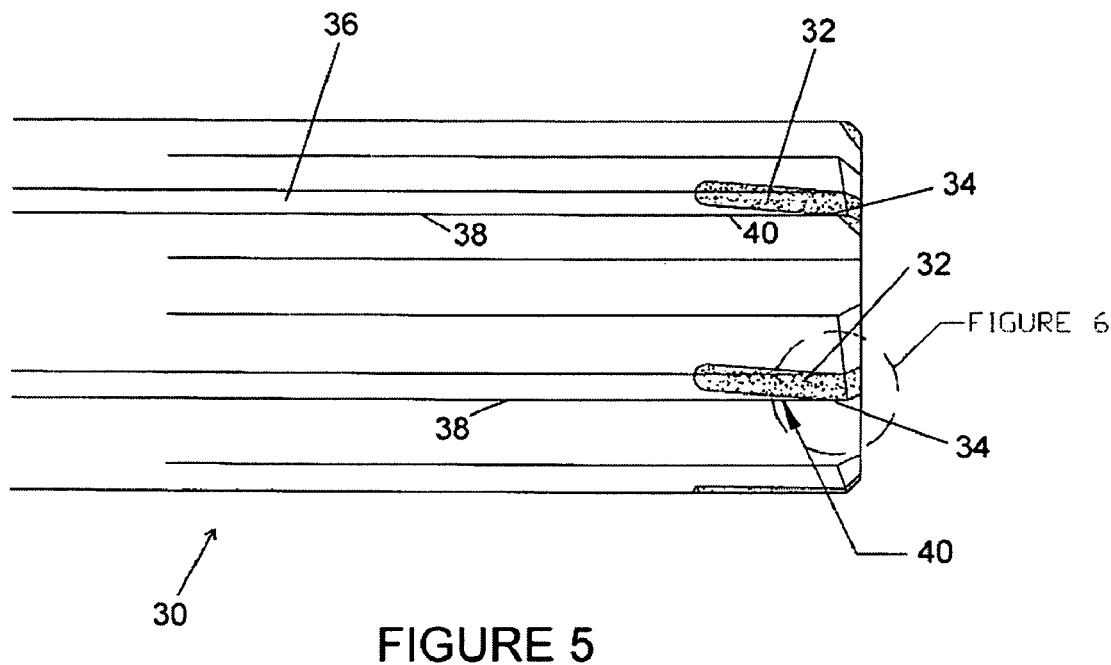
FIG. 5 is a side plan view of an embodiment of the end of a reamer according to the present invention.
Figure 6:
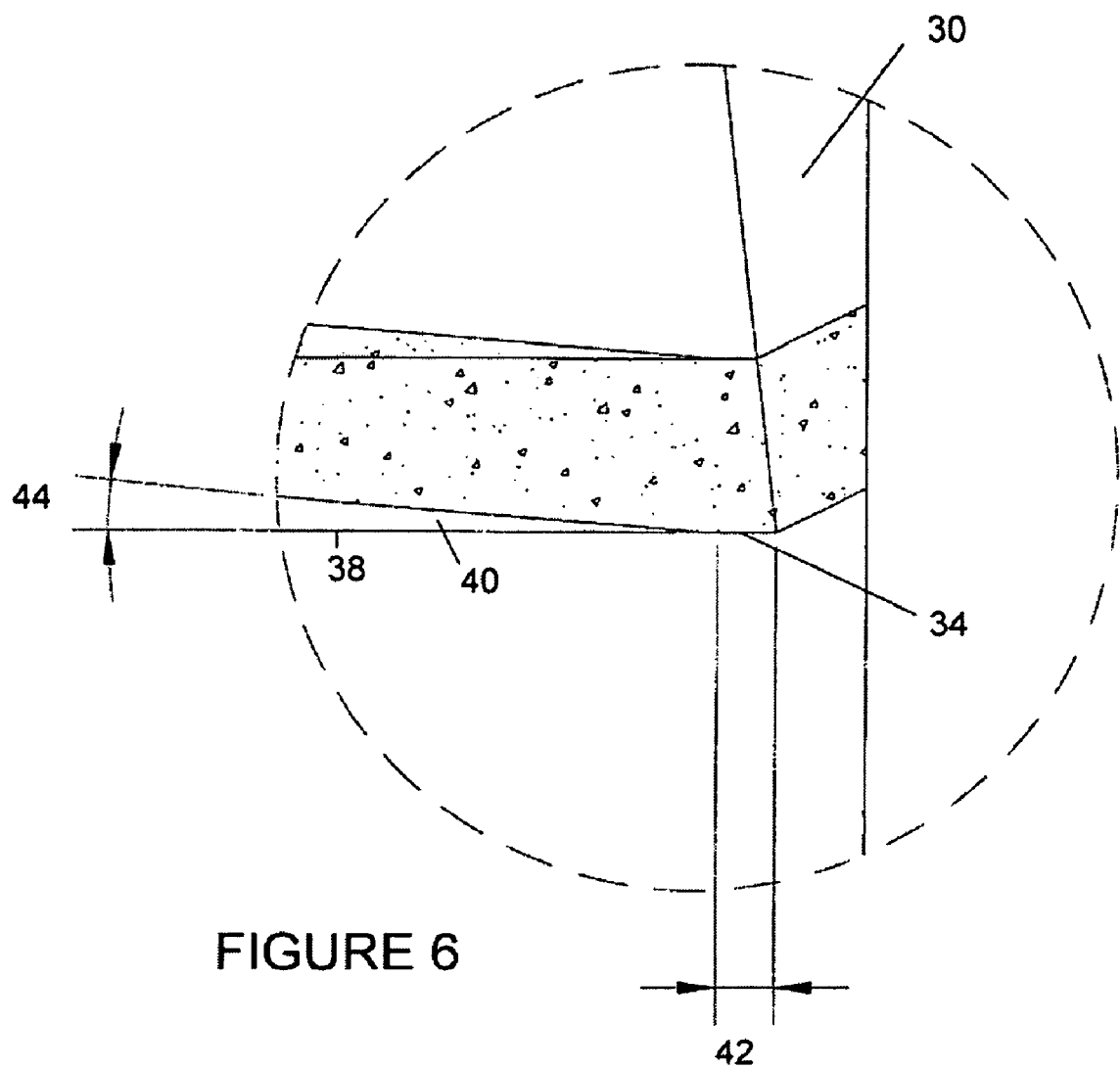
FIG. 6 is an enlarged view of the reamer shielding at the corner of a reamer in the area specified in FIG. 5.

FIGS. 5 and 6 illustrate a PCD or PCBN reamer also using a shielded cutting edge. The reamer 30 of FIG. 5 has one or more veins 32 of a suitable material such as Polycrystalline Diamond (PCD) or Polycrystalline Cubic Boron Nitrite (PCBN) having a cutting edge 34. The reamer 30 also has multiple lands 36 and lead 38 that are the leading edges of each land 36. At least one vein 32 is angled such that a shield 40 is created that extends along one of the leads 38 in front of and adjacent to the vein 32. Similar to the drill 10 of FIG. 3, the shield 40 is positioned in the area that is particularly susceptible to chipping so as to prevent unwanted chipping of the vein 32 during use of the reamer 30.

FIG. 6 shows the shielding 40 of the PCD or PCBN edge 34 for the reamer 30. In a similar fashion, an edge 34 of PCD or PCBN is exposed for a distance 42 near the corner of the reamer 30 of 0.005 inches, sufficient to engage the work piece but generally protected from damage by contact with the hole wall or guide bushing. The thickness of the shield 40 is defined by angle 44.

The scope of this invention is not limited to the above-described preferred embodiments. The terms and expressions used are terms of description and there is no intention of excluding any equivalents of the features shown and described, but it is recognized that various modifications, appreciable to one of ordinary skill, are possible within the scope of the invention claimed.

The invention claimed is:

1. A cutting tool comprising:
    a land made of a first material having a lead; and
    a vein embedded in the land made of a second material, the vein having an embedded end and an exposed end with a cutting edge, the vein is disposed at an acute angle to a plane having the central axis of the cutting tool, wherein a portion of the first material forms a shield that extends along the lead forward of and adjacent to the vein from the embedded end to the exposed end of the vein reducing the overall length of the exposed cutting edge of the vein, wherein the shield has a thickness proximate the embedded end that is greater than the thickness proximate the cutting edge.

2. The cutting tool of claim 1, wherein the first material comprises tungsten carbide.

3. The cutting tool of claim 1, wherein the second material comprises PCD.

4. The cutting tool of claim 1, wherein the second material comprises PCBN.

5. The cutting tool of claim 1, wherein the length of the exposed cutting edge of the vein ranges between about 0.002 inches and about 0.010 inches.

6. The cutting tool of claim 1, wherein the thickness of the shield forward of the vein proximate the embedded end is greater than about 0.005 inches.

7. The cutting tool of claim 1, wherein the cutting tool is a drill having a helix angle of about twenty-four degrees.

8. The cutting tool of claim 1, wherein the cutting tool is a drill and the rake angle ranges between about four to eight degrees positive to the central axis of the drill.

9. The cutting tool of claim 1, wherein the cutting tool is a reamer.

10. A cutting tool comprising:
    A plurality of lands made of a first material and each having a lead; and
    a vein embedded in at least one of the plurality of lands made of a second material, the vein having an embedded end and an exposed end with a cutting edge, wherein the vein is disposed at an acute angle to a plane having the central axis of the cutting tool and a portion of the first material forms a shield that extends along at least one of the leads forward of and adjacent to the vein from the embedded end to the exposed end of the vein reducing the overall length of the exposed cutting edge of the vein, wherein the shield has a thickness proximate the embedded end that is greater than the thickness proximate the cutting edge.

11. The cutting tool of claim 10, wherein the first material comprises tungsten carbide.

12. The cutting tool of claim 11, wherein the second material comprises PCD.

13. The cutting tool of claim 12, wherein the second material comprises PCBN.

14. The cutting tool of claim 10, wherein each land has at least one vein disposed at an acute angle to a plane having the central axis of the cutting tool and having an embedded end and an exposed end with a cutting edge and a shield that extends along each of the leads forward of and adjacent to the corresponding vein from the embedded end to the exposed end of the vein reducing the overall length of each exposed cutting edge of each vein.

15. The cutting tool of claim 10, wherein the cutting tool is a drill.

16. The cutting tool of claim 10, wherein the cutting tool is a reamer.

17. A method for making a shielded cutting tool comprising the steps of:
    forming a cutting tool with a land made of a first material and having a lead, and with a vein embedded in the land disposed at an acute angle to a plane having the central axis of the cutting tool, the vein being made of a second material and having an embedded end and an exposed end;
    grinding the cutting tool to form a cutting edge on the exposed end of the vein; and grinding the cutting tool to form a shield along the lead forward of and adjacent to the vein from the embedded end to the exposed end of the vein reducing the length of cutting edge of the vein.

18. The method of claim 17, wherein the vein is disposed at an angle to the central axis of the cutting tool.

19. The method of claim 17, wherein the first material comprises tungsten carbide.

20. The method of claim 17, wherein the second material comprises a sintered abrasive particulate.

21. The cutting tool of claim 1, wherein given a predetermined helix angle for the cutting tool, by varying the rake angle, the amount of vein that is exposed at the exposed end of the vein will also vary correspondingly while maintaining the shield forward of and adjacent the vein.

* * * * *